United States Patent [19]

Lal et al.

[11] Patent Number: 5,049,451
[45] Date of Patent: * Sep. 17, 1991

[54] HIGH-COERCIVITY THIN-FILM RECORDING MEDIUM

[75] Inventors: Brij B. Lal, San Jose; Atef H. Eltoukhy, Saratoga, both of Calif.

[73] Assignee: HMT Technology Corporation, Fremont, Calif.

[*] Notice: The portion of the term of this patent subsequent to Apr. 2, 2008 has been disclaimed.

[21] Appl. No.: 626,193

[22] Filed: Dec. 12, 1990

Related U.S. Application Data

[63] Continuation-in-part of Ser. No. 567,598, Aug. 15, 1990.

[51] Int. Cl.$^5$ .............................................. B32B 15/01
[52] U.S. Cl. .................................... 428/611; 428/621; 428/630; 428/651; 428/667
[58] Field of Search ............... 428/611, 621, 630, 651, 428/667

[56] References Cited

U.S. PATENT DOCUMENTS 5,004,652  4/1991  Lal et al. ............................ 428/611

*Primary Examiner*—R. Dean
*Assistant Examiner*—David W. Schumaker
*Attorney, Agent, or Firm*—Peter J. Dehlinger

[57] ABSTRACT

A high-coercivity thin-film magnetic recording medium, and method of producing the medium, is disclosed. The medium has a sputtered chromium underlayer, preferably about 300–1,000 Å thick, and a sputtered magnetic layer, preferably about 200–800 Å thick, composed of an alloy containing between 70–80% cobalt, 10–20% chromium, 3–20% platinum, and 2–10% tantalum, formed on the chromium underlayer. The medium is characterized by high coercivity, resolution, amplitude and loop squareness value, and low bit shift.

11 Claims, 12 Drawing Sheets

HIGH-COERCIVITY THIN-FILM RECORDING MEDIUM

This application is a continuation-in-part of co-pending U.S. patent application for "High Coercivity Thin-Film Recording Medium and Method", U.S. Ser. No. 567,598, filed Aug. 15, 1990.

FIELD OF THE INVENTION

The present invention relates to a high-coercivity thin-film magnetic recording medium and to a method of producing the same.

REFERENCES

Howard, J. K., J Vac Sci Technol, A4(1):1 (1986).
Hughes, G. F., J Appl Phys, 54:5306 (1983).
Kitaka, M., et al., J Appl Phys, 54(12):7089 (1983).
Miura, S., et al., IEEE Trans on Magn, 24(6):2718 (1988).
Sanders, I. L., et al., IEEE Trans on Magn, 25(5):3869 (1989).
Shiroishi, Y., et al., IEEE Trans on Magn, 24:2730 (1988).

BACKGROUND OF THE INVENTION

Thin-film hard disk magnetic media are widely used in read/write memory devices in computers. Increasingly, there is an effort in the thin-film medium industry to achieve higher recording density (Howard). Among the magnetic properties which are important to a high recording density are:

(1) Coercivity, defined as the magnetic field required to reduce the remanence magnetic flux to 0, i.e., the field required to erase a stored bit of information. Higher coercivity in a medium allows adjacent recorded bits to be placed more closely together without mutual cancellation. Thus, higher coercivity is associated with higher information storage density.

(2) Magnetic remanence, which determines the signal amplitude which can be read from an isolated pulse stored in the medium—the greater the remanence, the greater the signal amplitude which can be detected in a reading operation.

(3) Loop squareness, or the ratio of coercivity to saturation field. It can be appreciated that as the saturation field becomes smaller (approaches the coercivity), it takes less field strength to switch or "write to" the medium. In practical terms, this means that when a new signal is written over an old signal, the ratio of the old signal residual to the new signal is relatively small. This ratio is referred to as overwrite, a small overwrite ratio indicating good writability.

(4) Bit shift or peak shift, a phenomenon which refers to the broadening between voltage peaks, as well as reduction in peak amplitude, which occurs in the read voltage waveform, where the peak-to-peak broadening time is typically less than about 25 nsec. It is desired to achieve low bit shifting, inasmuch as bit shifting limits the resolution at which adjacent peaks can be read, and thus places an upper limit on recording density.

(5) Signal amplitude, or peak-to-peak amplitude of a single pulse, as a function of recording frequency. The recording density of the medium is related to the drop in signal amplitude at increasing recording frequency.

(6) Signal resolution, defined as the ratio of the high-frequency track average amplitude divided by the low-frequency track amplitude. The recording frequency at which 70% resolution is achieved represents one measure of information storage density on the disk.

Thin-film media or disks are commonly prepared by sputtering a thin magnetic film on a substrate, such as a textured, plated aluminum substrate. The disk is typically prepared by sputtering an underlayer, such as a chromium underlayer, onto the substrate surface, then sputtering a cobalt-based magnetic thin film over the underlayer. A protective, lubricating carbon overcoat may be applied over the thin-film layer by sputtering.

A variety of magnetic film alloys have been reported in thin-film media of the type just described (e.g., Kitaka, Miura, Sanders, Shiroishi). U.S. Pat. No. 4,888,514 discloses a thin film disk having a cobalt-nickel layer sputtered over a chromium underlayer. A coercivity of 650 Oe (Oersteds), a saturation magnetization of greater than 10,000 Gauss, and a loop squareness ratio of greater than 0.9 were reported. Magnetic thin-film media with chromium underlayer with cobalt-nickel or cobalt-nickel-chromium alloy magnetic layers are also disclosed in U.S. Pat. Nos. 4,833,044, 4,816,127, and 4,735,840.

SUMMARY OF THE INVENTION

It is one general object of the invention to provide a thin film medium having high coercivity, remanence, and loop squareness.

It is another object of the invention to provide a sputtering method for producing such a medium.

The invention includes, in one aspect, a magnetic recording medium formed of a substrate, a sputtered crystalline underlayer on the substrate, and a sputtered magnetic layer composed of an alloy containing between 70-80 atom percent cobalt, 10-20 atom percent chromium, 3-20 atom percent platinum, and 2-10 atom percent tantalum, on the chromium underlayer.

In a preferred embodiment, the sputtered crystalline underlayer is a chromium underlayer with a thickness of between about 300-3,000 Å and preferably about 300-1,000 Å. The magnetic layer in this embodiment has a thickness between about 200-1,000 Å and preferably between about 200-800 Å. The medium is characterized by:

(a) a coercivity greater than about 1,800 Oersteds;
(b) signal resolution, at 31 kiloflux changes/in, of greater than about 85%;
(c) signal amplitude, measured at a recording frequency of 5.11 MHz, of greater than about 340 microvolts;
(d) a bit shift of less than about 18 per nsec., and preferably less than about 16 nsec; and
(e) a loop squareness ratio of greater than about 0.85.

In another aspect, the invention includes a method of forming a magnetic recording disk characterized by (a) a coercivity of greater than about 1800 Oersteds; (b) signal resolution, at 31 kiloflux changes/in, of greater than about 85%; (c) signal amplitude, measured at a recording frequency of 5.11 MHz, of greater than about 340 microvolts; (d) a bit-shift of less than about 18 nsec; and (e), a loop squareness ratio of greater than about 0.85. The disk is formed by sputtering a chromium underlayer onto a substrate, to a final underlayer thickness between about 300-3,000 Å, and sputtering onto the underlayer, to a thickness of between about 200-1,000 Å, a magnetic layer composed of an alloy containing between 70-80 atom percent cobalt, 10-20 atom percent chromium, 3-20 atom percent platinum, and 2-10 atom percent tantalum.

These and other objects and features of the invention will become more fully understood when the following detailed description of the invention is read in conjunction with the accompanying drawings.

DETAILED DESCRIPTION OF THE DRAWINGS

I. Thin-Film Medium

Figure 1:
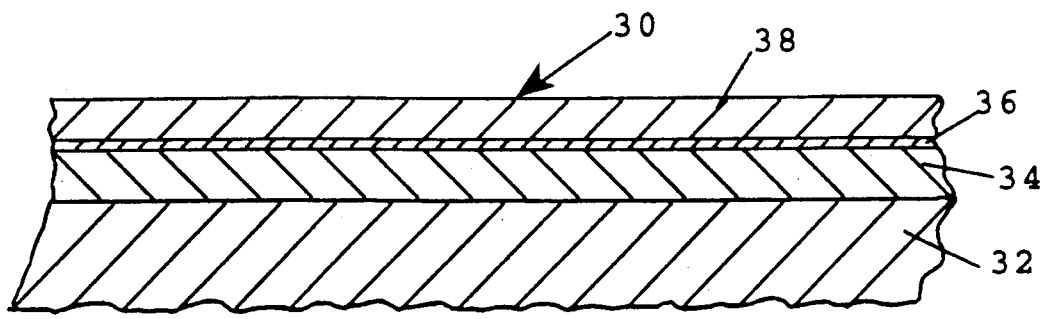
FIG. 1 is a sectional view of a thin-film medium formed in accordance with the invention.

FIG. 1 shows in cross section view, a fragmentary portion of a thin-film medium of disk 30 formed in accordance with the present invention. The disk generally includes a rigid substrate 32, and forming successive thin-film layers over the substrate, a crystalline underlayer 34, a magnetic thin-film layer 36, and a protective carbon overcoat 38.

The substrate may be a textured substrate, such as a conventional surface-coated, textured aluminum substrate of the type used commonly for digital recording medium, or a textured glass or ceramic substrate, such as described in co-owned patent application for "Glass Substrate with Controlled Low-Friction Surface," U.S. Ser. No. 475,715, filed Feb. 20, 1990.

The crystalline underlayer is preferably a sputtered chromium underlayer having a thickness between about 300–3,000 Å. Magnetic recording properties of thin-film media, as a function of chromium underlayer thickness, are discussed in Section II and III below. As will be seen, high coercivity, remanence and loop squareness values are achieved particularly at an underlayer thickness of between about 300–1,000 Å. Chromium-containing alloys, such as CrV, CrGd and CrSi, may also be suitable, as may a tungsten underlayer.

According to an important feature of the invention, the magnetic thin-layer film is formed by sputtering onto the underlayer, an target alloy composed of 70–80 atom percent cobalt, 10–20 atom percent chromium, 3–20 atom percent platinum, and 2–10 atom percent tantalum. As will be seen in Sections II and III below, this alloy gives substantially higher coercivity values than known thin-film alloys, such as a widely used thin-film cobalt/chromium/tantalum alloy. At the same time, remanence, loop squareness, and bit shift characteristics of the medium formed with the quaternary cobalt/chromium/platinum/tantalum alloy are as good or better than those observed with known thin-film alloys.

The thickness of the magnetic layer is preferably between about 200–1,000 Å, more preferably between about 200–800 Å. The magnetic recording properties of the thin film medium, as a function of magnetic layer thickness, are given below.

The carbon overcoat in the thin-film medium is preferably a carbon layer formed by sputtering carbon onto the magnetic layer, under conditions in which the carbon is in a predominantly $sp_2$, diamond-like structure. The overcoat thickness is preferably between about 250 and 500 Å.

II. Method of Producing the Medium

Figure 2:
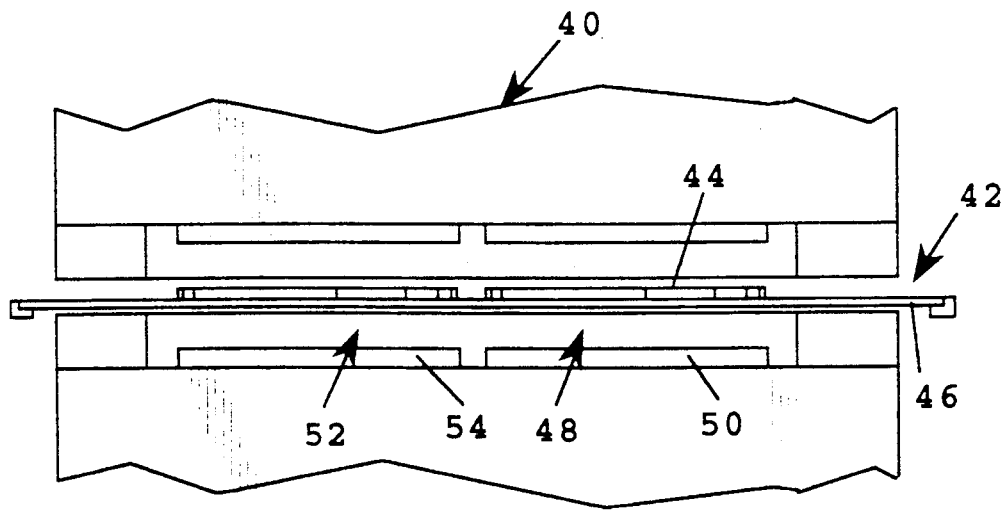
FIG. 2 is a schematic illustration of the sputtering steps used in forming the medium of the invention.

FIG. 2 shows, in schematic view, a portion of a sputtering apparatus 40 which is used, in the method of the invention, for producing the thin-film medium described in Section 1. The apparatus includes a vacuum chamber 42 having at least four stations at which sputtering or heating operations occur. A heating station (not shown) at the upstream end of the chamber has a plurality of infrared lights which are arrayed for heating both sides of a substrate, such as substrate 44, carried through the station in the chamber on a disk holder 46.

Just downstream of the heating station is a first sputtering station 48 at which the crystalline underlayer is formed on a substrate, in a manner to be described. The station includes a pair of targets, such as target 50, effective to sputter chromium onto opposite sides of a substrate. The targets in station 48 are preferably pure chromium targets, or chromium alloys containing predominantly chromium.

A second sputtering station 52 downstream of chamber 48 is designed for sputtering a magnetic film onto the underlayer. The station includes a pair of sputtering targets, such as target 54, for sputtering the magnetic film alloy onto the substrate, after formation of the underlayer on the substrate. The target in this station are formed of an alloy containing between 70-80 atom percent cobalt, 10-20 atom percent chromium, 3-20 atom percent platinum, and 2-10 atom percent tantalum. The alloy is formed and shaped for use as a sputtering target by conventional metallurgical methods.

Also included in the apparatus, but not shown here, is a final downstream station at which a carbon overcoat is sputtered on both sides of the magnetic disk. The basic sputtering apparatus is preferably a commercial system, such as in available from Varian (Santa Clara, CA), Circuits Processing Apparatus (Fremont, CA), ULVAC (Japan), Leybald Heraeus (Germany), VACTEC (Boulder, Co.), or Materials Research Corporation (Albany, NY). These systems are double-sided, in-line, high-throughput machines having two interlocking systems, for loading and unloading.

In operation, the sputtering chamber is evacuated to pressure of about $10^{-7}$ torr, and argon gas is introduced into the chamber to a final sputtering pressure of 5-20 mTorr. The effect of sputtering pressure, in the range of 5-13.5 mTorr argon on coercivity, is given in Table 1 below. Medium No. 1 in the table refers to a thin-film medium of the present invention having a 200 Å magnetic layer composed of 75 atom percent cobalt, 12 atom percent chromium, 10 atom percent platinum, and 3 atom percent tantalum (Co/Cr/Pt/Ta alloy) over an 800 Å chromium underlayer. Medium No. 2 in the table refers to a thin-film medium formed with a 200 Å magnetic layer composed of a standard magnetic film alloy containing 84.5 atom percent cobalt, 12.5 atom percent chromium, and 3 atom percent tantalum (Co/Cr/Ta) alloy. As seen in the table, the coercivity in medium No. 1 is relatively independent of sputtering pressure, in the argon pressure range which was tested. The substantially greater coercivity in the medium of the invention, discussed below, can be seen here.

TABLE 1

| PRES. (mTorr) | COERCIVITY #1 | (Oe) #2 |
|---|---|---|
| 5 | 1990 | 1390 |
| 9.5 | 1920 | 1220 |
| 13.5 | 2000 | 1220 |

The substrate is heated in the heating station to a selected temperature before advancing into the two sputtering chambers. The heating conditions in the apparatus are preferably adjusted to achieve a substrate temperature of between about 200° C., and preferably about 270° C. Table 2 below shows the coercivities measured in thin film media formed at substrate sputtering temperatures of 200° C. and 270° C. The media have a 800 Å chromium underlayer and magnetic layer thicknesses indicated. Medium No. 1 and 2 refer to the magnetic film alloys noted above. As seen, higher coercivity was achieved at 270° C. for each disk tested. Highest coercivity was in each media disk tested was achieved at a substrate temperature of 270° C. At each temperature and magnetic film thickness, the Co/Cr/Pt/Ta magnetic layer gave about 35-70% higher coercivity than the corresponding Co/Cr/Ta magnetic layer.

TABLE 2

| ML (Å) | TEMP (°C.) | COERCIVITY Medium #1 | (Oe) Medium #2 |
|---|---|---|---|
| 200 | 200 | 1470 | 870 |
| 200 | 270 | 1990 | 1390 |
| 600 | 200 | 1420 | 1000 |
| 600 | 270 | 1680 | 1230 |

Studies of the effect of crystal microstructure on the coercive force in a thin-film medium show that coercive force increases with increasing grain size and with increased boundary separation (Kitada, Hughes). These findings, combined with the results presented above, suggest that a significant increase in grain size and boundary separation of the Co/Cr/Pt/Ta film can be achieved at higher substrate temperature. Although a substrate with a Ni/P plating, such as employed in the studies reported above, has an upper temperature limit of about 290°-300° C., other substrates, such as a silicon substrate, can be heated to much higher temperatures during sputtering and thus may be employed where greater coercivity is desired in the disk.

The heated substrate is moved into the first sputtering chamber, and the chromium underlayer is sputtered onto the textured disk surface under which in the deposition layer (110) crystal plane is predominantly the plane of the substrate. That is, the chromium layer has a high anisotropic parallel/perpendicular crystal orientation ratio. This anisotropy is important in establishing desired magnetic layer crystal orientation during formation of the magnetic layer in the parallel c-axis direction, which in turn, is requisite for achieving high coercivity in longitudinal reading. Sputtering voltage and deposition rates which favor (110) crystal plane formation are known to those skilled in the art.

As indicated above, the underlayer is deposited to a thickness of between about 300-3,000 Å. FIGS. 3-9 are plots of several magnetic disk properties shown as a function of chromium underlayer thickness, typically measured at underlayer thicknesses of 300 Å, 800 Å, and 2,100 Å, and at a magnetic film thickness of 600 Å. Some of the plots also include a 1,700 Å underlayer thickness data point. The * symbol indicates a disk formed with an alloy #1 (Co/Cr/Pt/Ta) magnetic film, and the open rectangle symbol, a disk formed with an alloy #2 (Co/Cr/Ta) magnetic film, as detailed above.

Bulk magnetic properties were determined by vibrating sample magnetometry. Magnetic recording testing was carried out on a Guzik Model RWA 221, using a thin-film inductive reading and recording head with a gap length of 14 μin., a gap width of 472 μin., and a flying height of 4.5 μin. The head inductance was 1.1 μHenry and resistance, 30 ohms. Recording current was 25-30 mAmps for saturation.

Figure 3A:
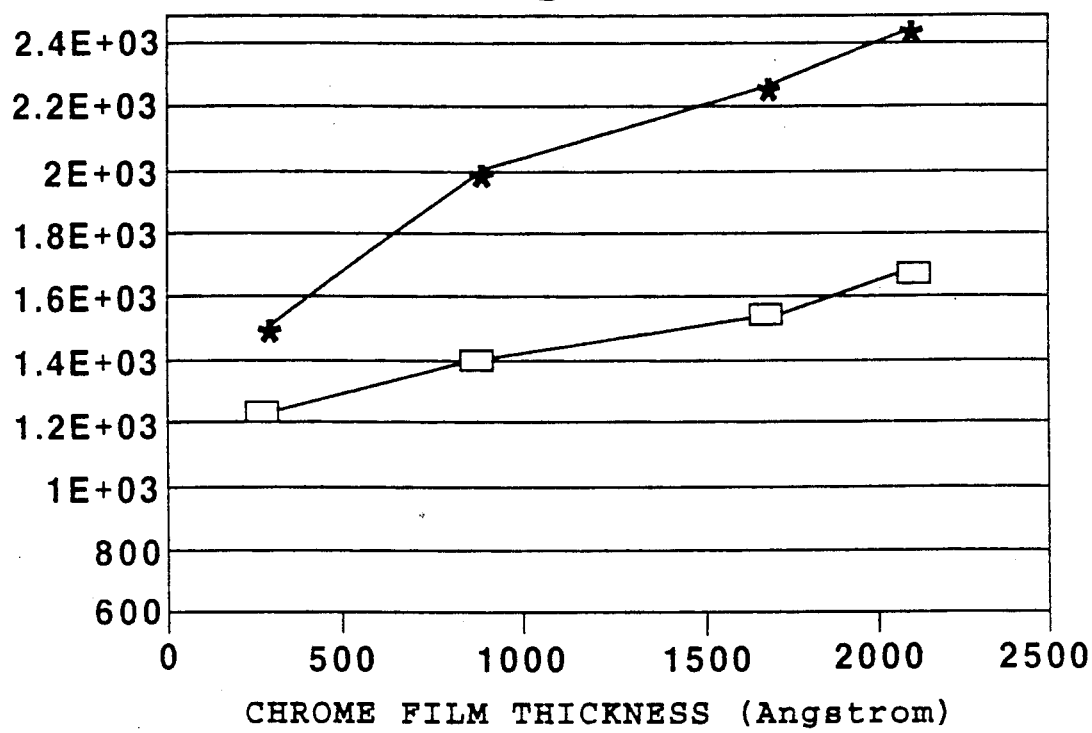
FIGS. 3A and 3B are plots of coercivity as a function of underlayer film thickness, for a sputtered magnetic film formed of a cobalt/chromium/tantalum/platinum alloy (alloy 1), in accordance with the present invention (*) and a sputtered magnetic film formed of cobalt/chromium/tantalum alloy (alloy 2) as known in the prior art (open rectangles), at magnetic film thicknesses of 200 Å (3A), and 600 Å (3B)
Figure 3B:
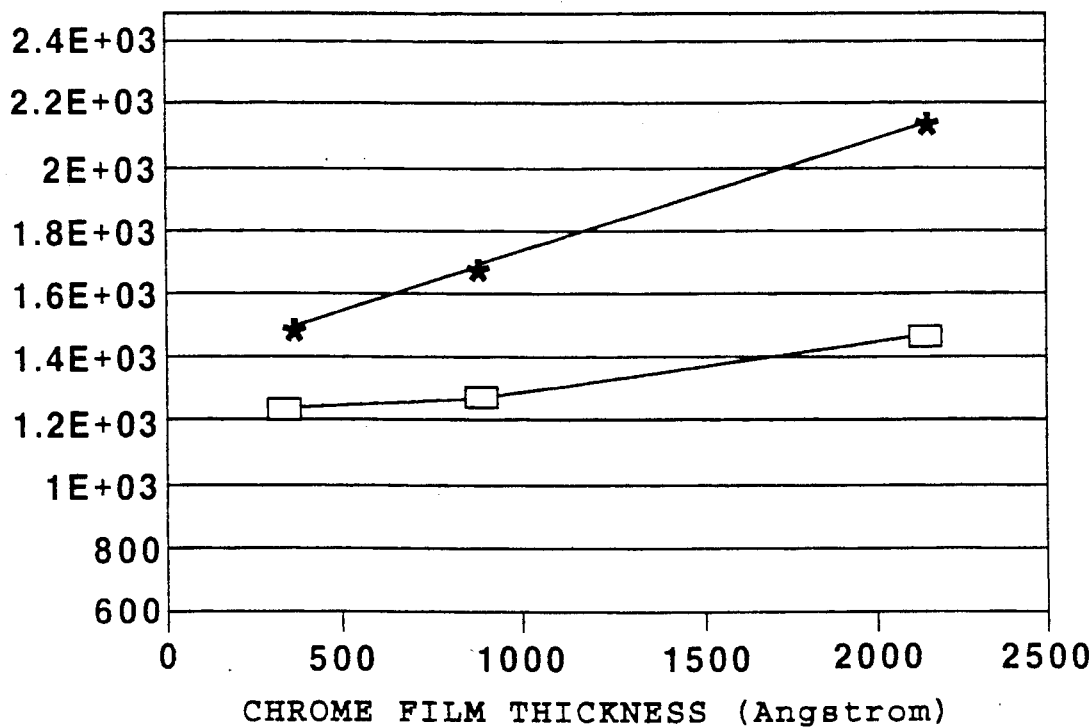

FIGS. 3A and 3B show the increase in coercivity with increasing underlayer thickness, up to an underlayer thickness of 2,100 Å, at magnetic layer thicknesses of both 200 Å (FIG. 3A) and 600 Å (FIG. 3B).

Figure 4:
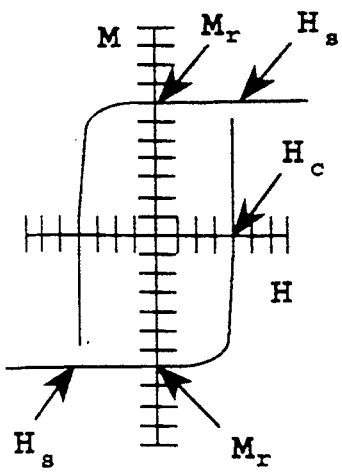
FIG. 4 shows an M-H hysteresis loop of an exemplary thin-film medium.
Figure 5A:
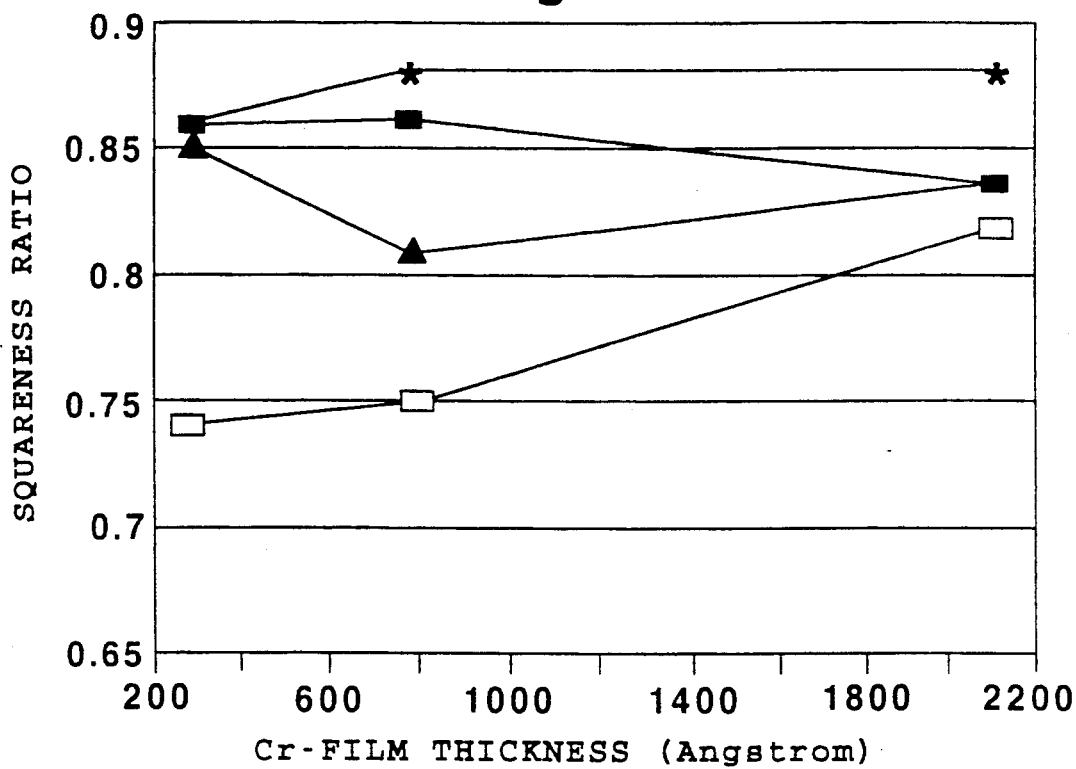
FIG. 5A is a plot of squareness ratio as a function of underlayer thickness in thin-film media having a 600 Å magnetic layer formed of alloy 1 (*) and alloy 2 (solid triangles)
Figure 5B:
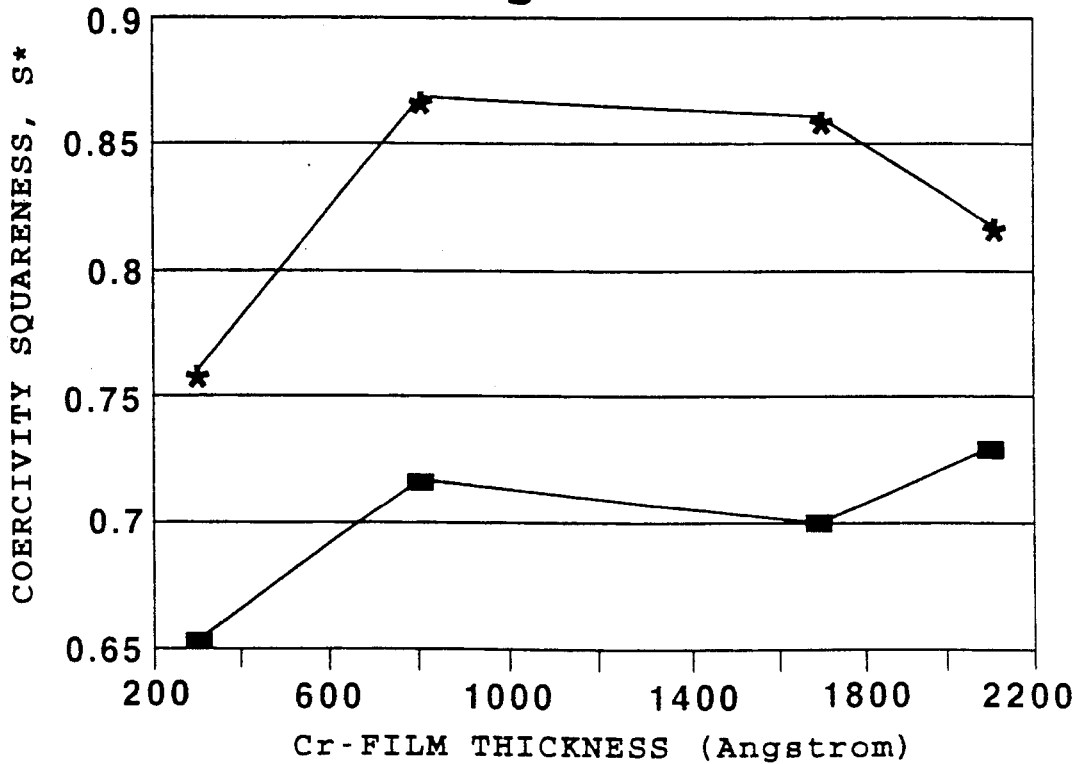
FIG. 5B is a plot of Hc squareness as a function of underlayer thickness in thin-film media having a 600 Å magnetic layer formed of alloy 1 (*) and alloy 2 (solid rectangles)

The loop squareness ratio, plotted in FIG. 5, was determined from an M-H hysteresis such as illustrated in FIG. 4, from the ratio of My/Ms. The ratio of the coercivity squareness, shown in FIG. 5B, was also determined from the M-H hysteresis loop. For the thin-film media having the Co/Cr/Pt/Ta magnetic film of the present invention, maximum loop squareness and coercivity squareness were achieved at 800 Å underlayer thickness. It is noted that both loop squareness properties and coercivity squareness are significantly higher in media with a Co/Cr/Pt/Ta magnetic film than in media with a Co/Cr/Ta film, at all underlayer thicknesses.

Figure 6:
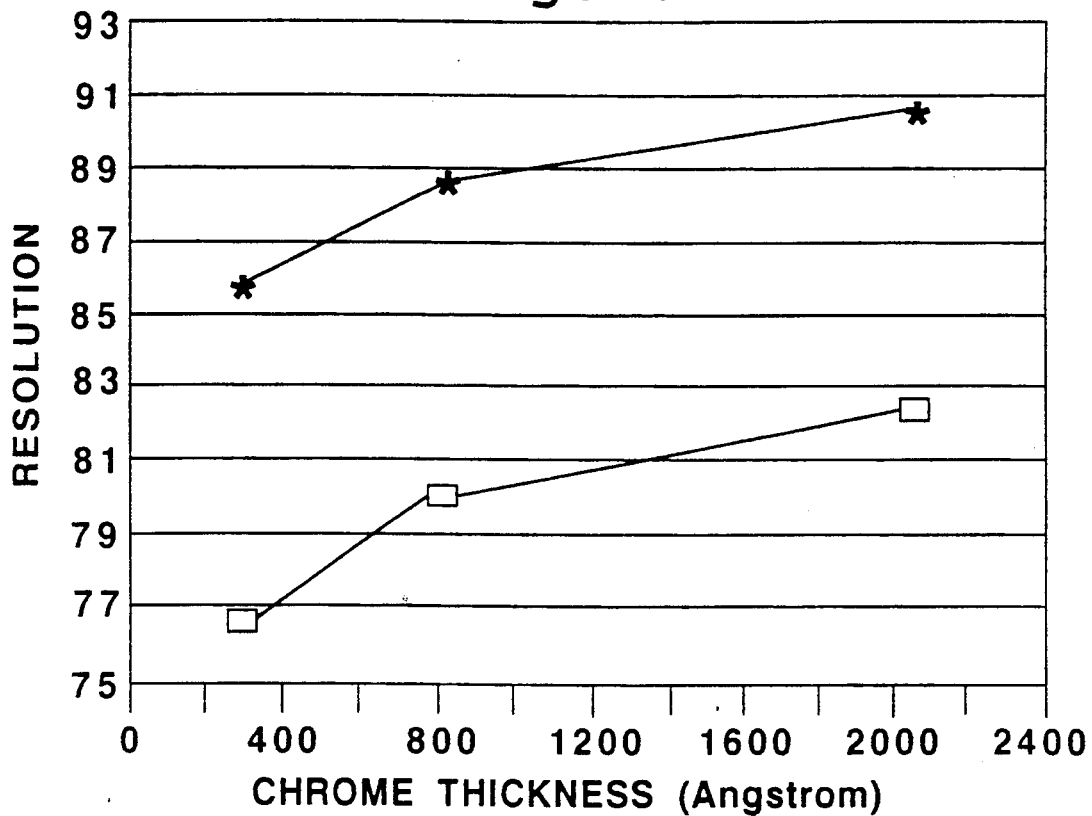
FIG. 6 is a plot of resolution as a function of underlayer thickness in thin-film media having a 600 Å magnetic layer formed of alloy 1 (*) and alloy 2 (open rectangles)

FIG. 6 is a plot of ID signal resolution measured at increasing underlayer thicknesses, at high and low recording frequencies of 5.11 MHz and 1.28 Mhz, respectively. Resolution was about 89% at 800 Å underlayer thickness in the thin-film medium of the invention (*), compared with a resolution of about 80% in a magnetic medium having a Co/Cr/Ta magnetic film.

Figure 7:
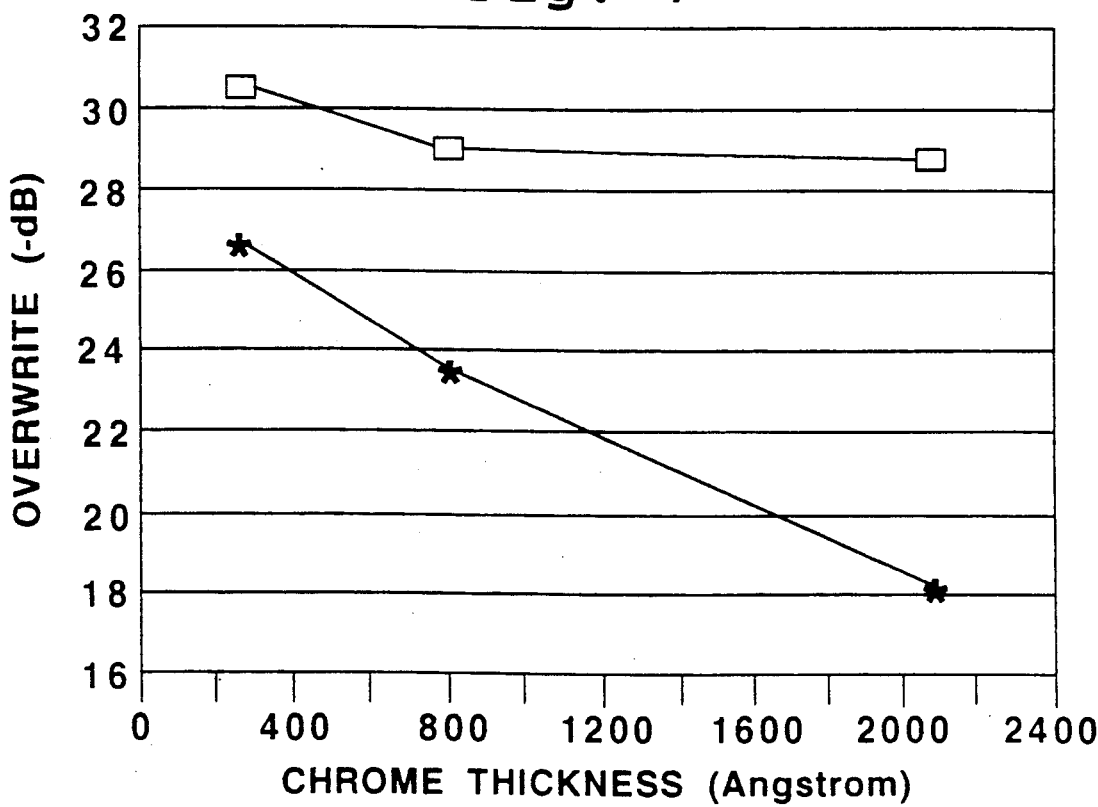
FIG. 7 is a plot of overwrite, in −dB units, as a function of underlayer thickness in thin-film media having a 600 Å magnetic layer formed of alloy 1 (*) and alloy 2 (open rectangles)

FIG. 7 shows the change in overwrite properties of thin-film media with increasing underlayer thickness. The overwrite values were determined from the ratio of residual signal value to the original signal after overwriting. The higher overwrite ratios (lower −dB values) observed for the Co/Cr/Pt/Ta disks, with respect to the Co/Cr/Ta magnetic-layer disks, reflects the higher coercivity of the Co/Cr/Pt/Ta disks, and thus has a pronounced thickness-dependent component.

Figure 8:
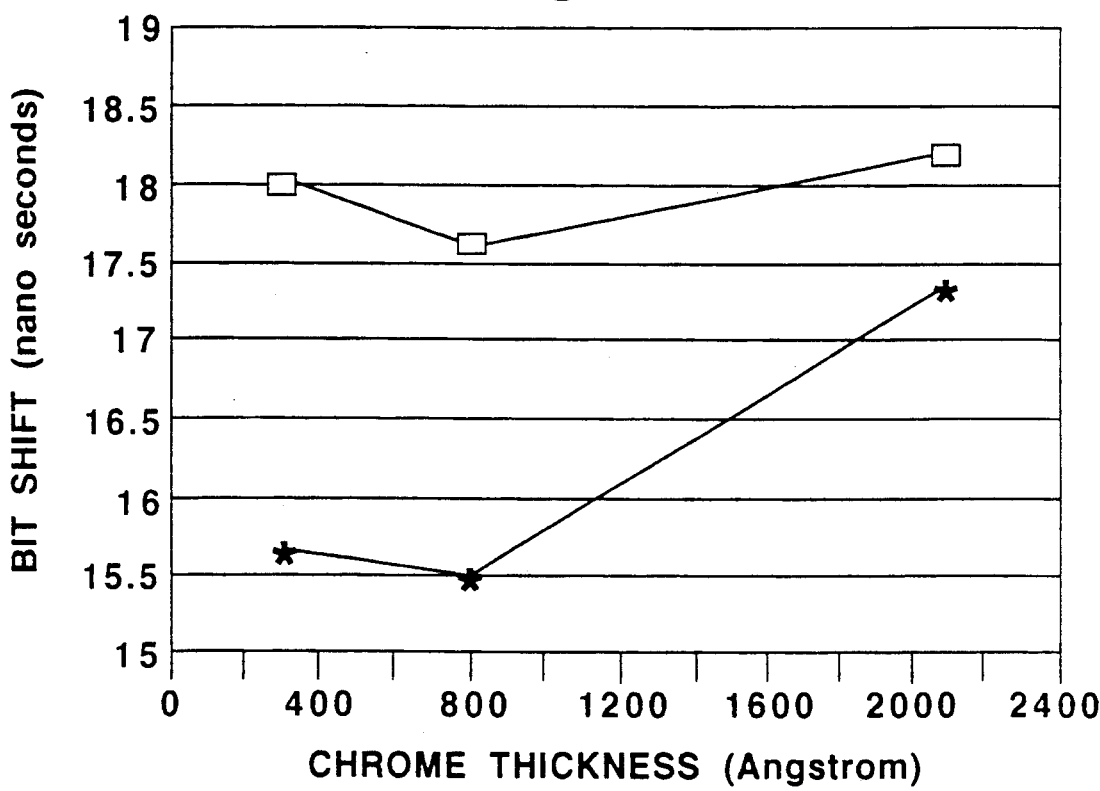
FIG. 8 is a plot of bit shift, in nsec, as a function of underlayer thickness in thin-film media having a 600 Å magnetic layer formed of alloy 1 (*) and alloy 2 (open rectangles)

Bit shift values, shown in FIG. 8, indicate best bit shift characteristics at 800 Å underlayer thickness. A substantially lower bit shift ratio is achieved with the Co/Cr/Pt/Ta magnetic film than with the Co/Cr/Ta magnetic film.

Figure 9:
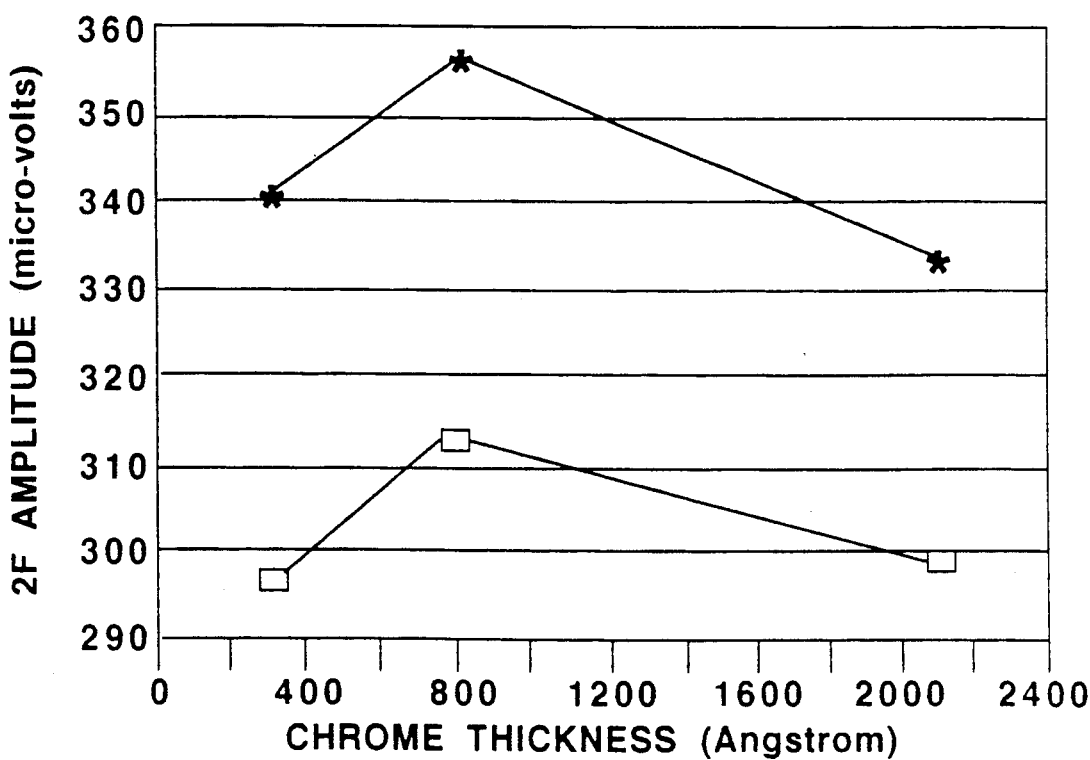
FIG. 9 is a plot of 2F amplitudes, expressed in microvolts, as a function of underlayer thickness in thin-film media having a 600 Å magnetic layer formed of alloy 1 (*) and alloy 2 (open rectangles)

Signal amplitude measurements, shown in FIG. 9, were made at a recording frequency of 5.11 MHz with 31 kiloflux changes/in (kfc/in). Best signal amplitude, over 360 microvolts, was achieved at 800 Å underlayer thickness and 600 Å magnetic layer thickness. As seen, the signal amplitude obtained with the magnetic film alloy of the present invention is substantially greater than that of with a conventional Co/Cr/Ta alloy magnetic film.

Magnetic remanence, measured in circumferential and radial directions, were used to calculate orientation ratios ($M_{r\text{-}cir}/M_{r\text{-}rad}$) in magnetic media having a 600 Å Co/Cr/Pt/Ta magnetic film (fourth column) or a 600 Å Co/Cr/Ta magnetic film (seventh column), at increasing underlayer thicknesses. As seen, highest orientation ratios were achieved at 300 and 800 Å underlayer thicknesses. Optimal orientations ratios were comparable in the two magnetic film types.

TABLE 3

| Cr-THICKNESS (Å) | REMANENCE (X10-3 emu) | | | REMANENCE (X10-3 emu) | | |
|---|---|---|---|---|---|---|
| | | ORIENTATION | | | ORIENTATION | |
| | CIR. | RADIAL | RATIO | CIR. | RADIAL | RATIO |
| 300 A | 1.726 | .994 | 1.7 | 1.469 | .797 | 1.8 |
| 800 A | 1.671 | 1.0 | 1.7 | 1.416 | .857 | 1.7 |
| 1700 A | 1.689 | 1.219 | 1.4 | 1.337 | .996 | 1.3 |
| 2100 A | 1.54 | 1.186 | 1.3 | 1.228 | 1.094 | 1.1 |

From the foregoing it can be appreciated that the underlayer thickness may be selected to achieve desired magnetic properties in the thin-film medium of the invention. In particular, highest coercivity and resolution are achieved at underlayer thicknesses up to 2,100 Å, whereas overwrite, and bit shift characteristics are improved or are optimal at a thickness in the 800 Å range. In general, optimal overall disk characteristics are achieved at an underlayer thickness between about 600–1,000 Å.

The underlayer thickness is controlled by conventional sputter deposition parameters, such as sputter pressure, target power, voltage, deposition time, etc. These parameters are adjusted, conventionally, to achieve the desired underlayer thickness.

After formation of the underlayer, the substrate is moved downstream on a disk holder into the second sputtering chamber, where the magnetic layer is sputtered onto the underlayer. The magnetic thin film is sputtered onto the underlayer under known conditions, such as described in the co-owned U.S. Pat. No. 4,816,127. The pressure and substrate temperature conditions are similar to those described above.

The thickness of the magnetic layer is preferably between about 200–1,000 Å, and more preferably 200–800 Å. FIGS. 10–16 are plots of several magnetic disk properties shown as a function of magnetic layer thickness of 120 Å, 200 Å, 600 Å, and 800 Å, typically at at underlayer thickness of 800 Å. The symbols in the figures are the same as those in FIGS. 3-9 discussed above.

Figure 10:
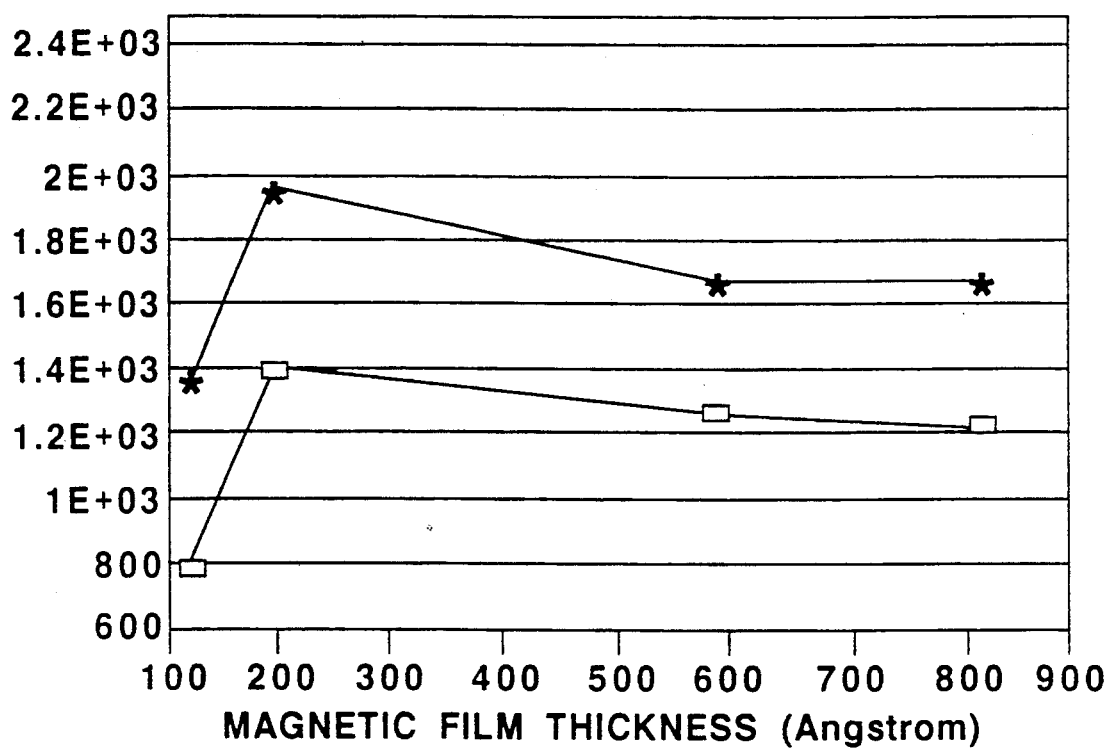
FIG. 10 is a plot of coercivity, in Oe, as a function of magnetic layer thickness in thin-film media having an 800 Å chromium underlayer and a magnetic layer formed of alloy 1 (*) and alloy 2 (open rectangles)

FIG. 10 shows a maximum coercivity value at 200 Å magnetic layer thickness. As seen, the coercivity of the Co/Cr/Pt/Ta magnetic layer medium is between about 400–600 Oe greater than that of the Co/Cr/Ta magnetic layer medium at all magnetic layer thicknesses.

Figure 11:
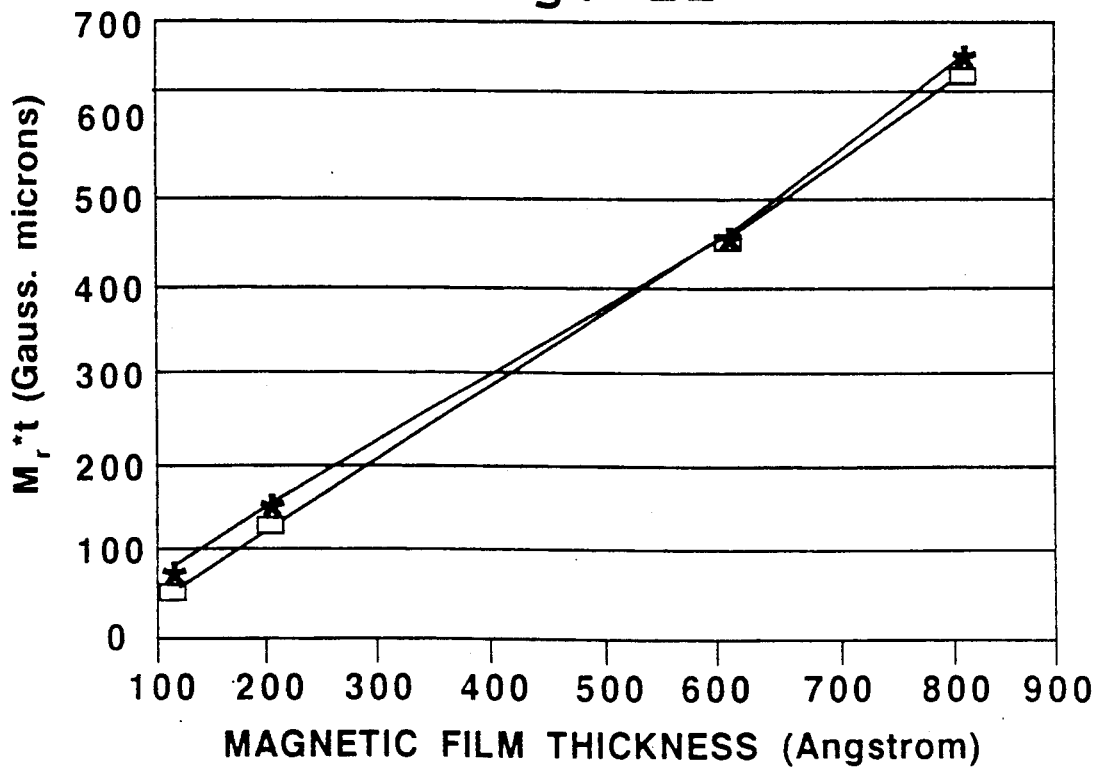
FIG. 11 is a plot of $M_r*t$ as a function of magnetic layer thickness in thin-film media having an 800 Å chromium underlayer and a magnetic layer formed of alloy 1 (*) and alloy 2 (open rectangles);solid rectangles)

The magnetic remanence ($M_r*t$) of the Co/Cr/Pt/Ta media is approximately identical to that of the Co/Cr/Ta media, and has about the same dependence of magnetic film thickness, as seen in FIG. 11.

Figure 12A:
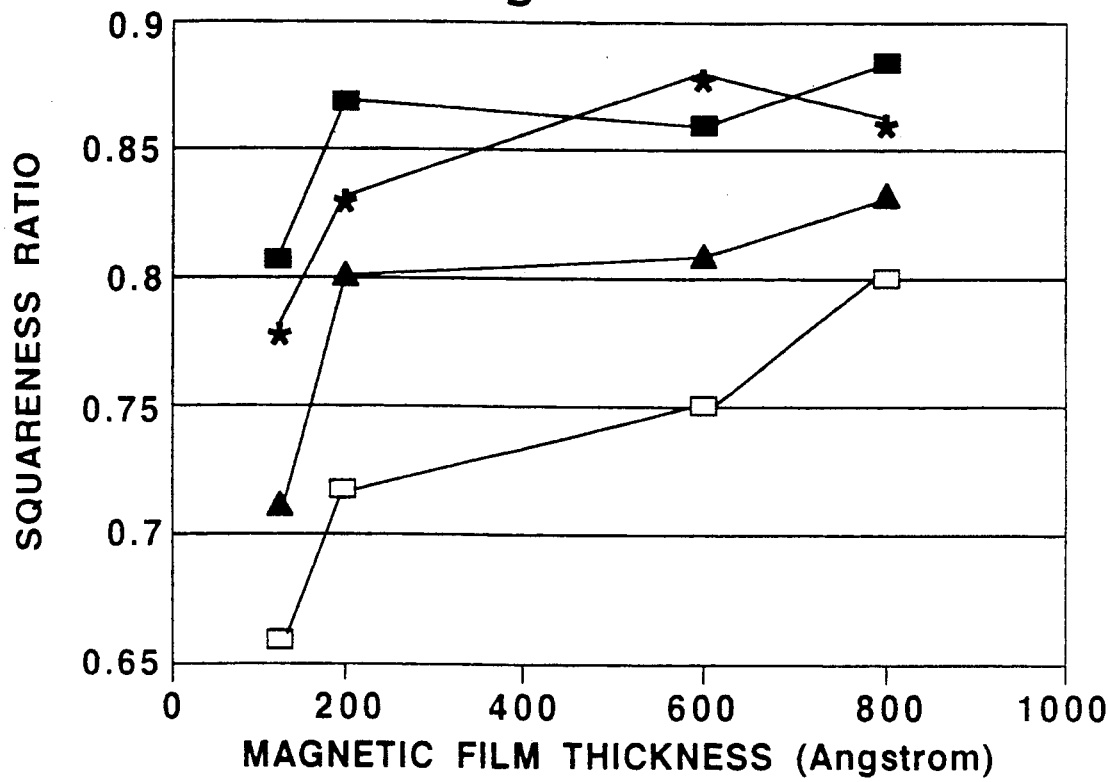
FIG. 12A is a plot of squareness ratio as a function of magnetic layer thickness in thin-film media having an 800 Å underlayer and a magnetic layer formed of alloy 1 (*) and alloy 2 (solid triangles)
Figure 12B:
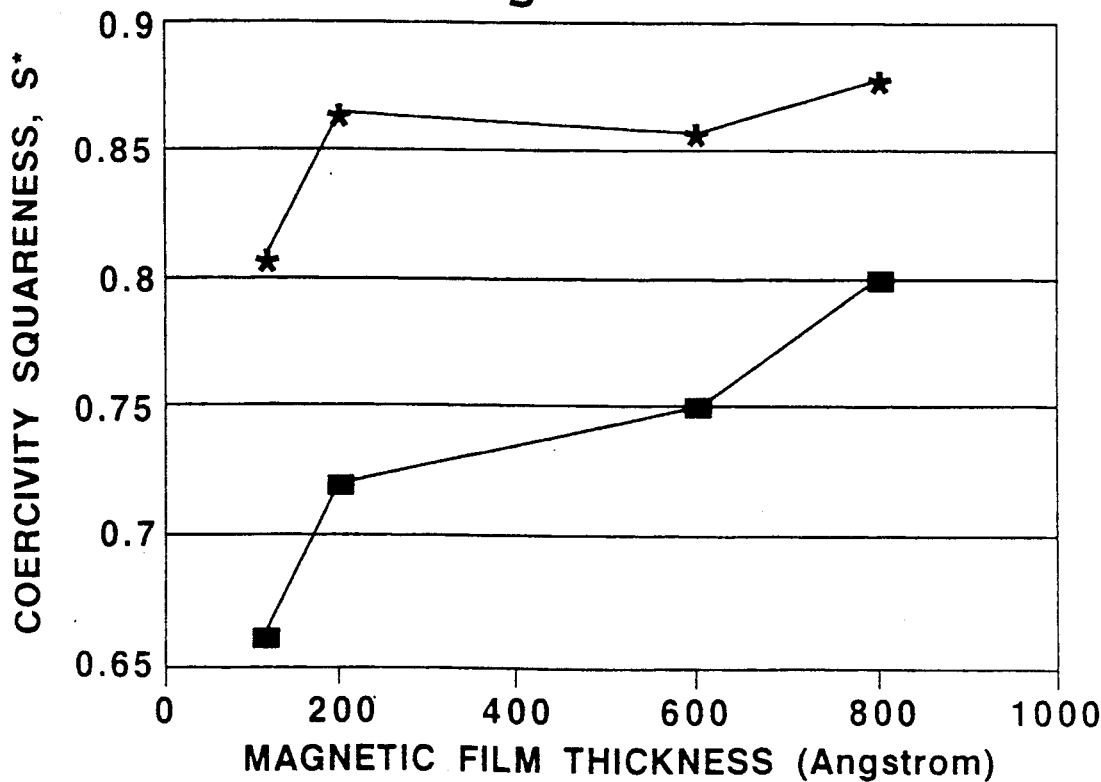

Loop squareness ratios, plotted in FIG. 12A, and coercivity squareness ratios, plotted in FIG. 12B, show that maximum loop squareness in the Co/Cr/Pt/Ta alloy disk (*) is achieved at 600 Å film thickness, whereas the Co/Cr/Ta film medium shows maximum loop squareness at 200 Å film thickness. The opposite thickness effect was seen for coercivity squareness (FIG. 12B).

Figure 13:
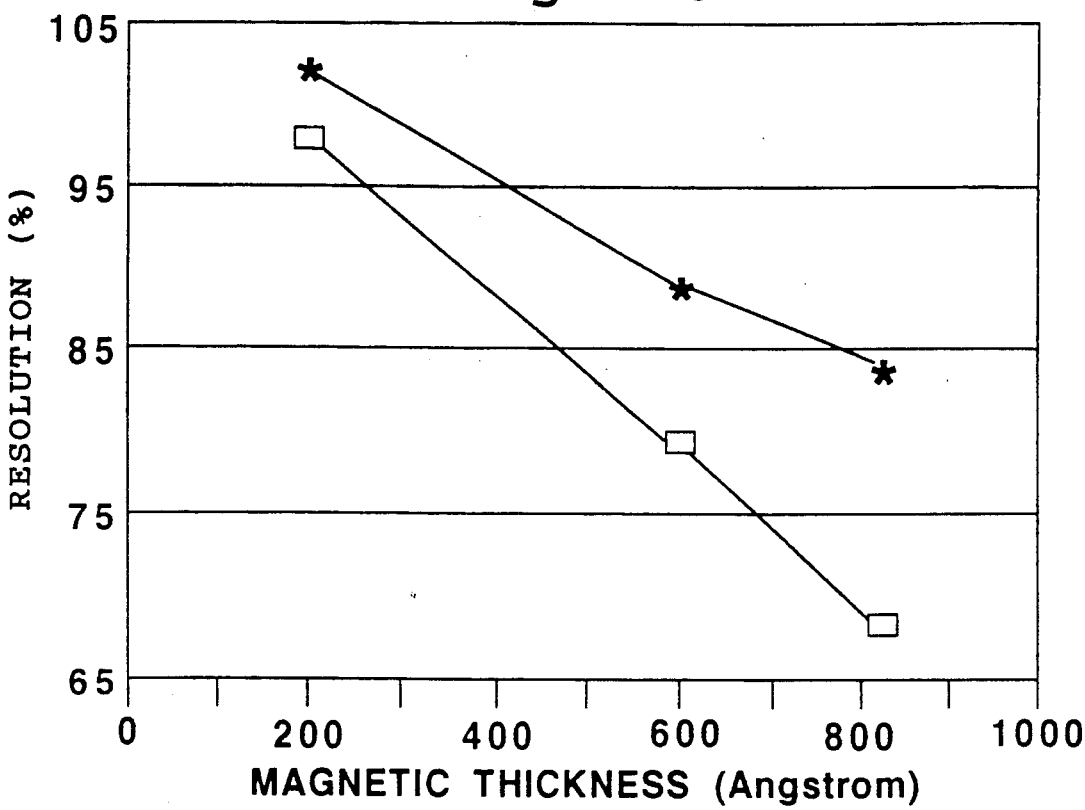
FIG. 13 is a plot of resolution as a function of magnetic layer thickness in thin-film media having an 800 Å chromium underlayer and a magnetic layer formed of alloy 1 (*) and alloy 2 (open rectangles)
Figure 14:
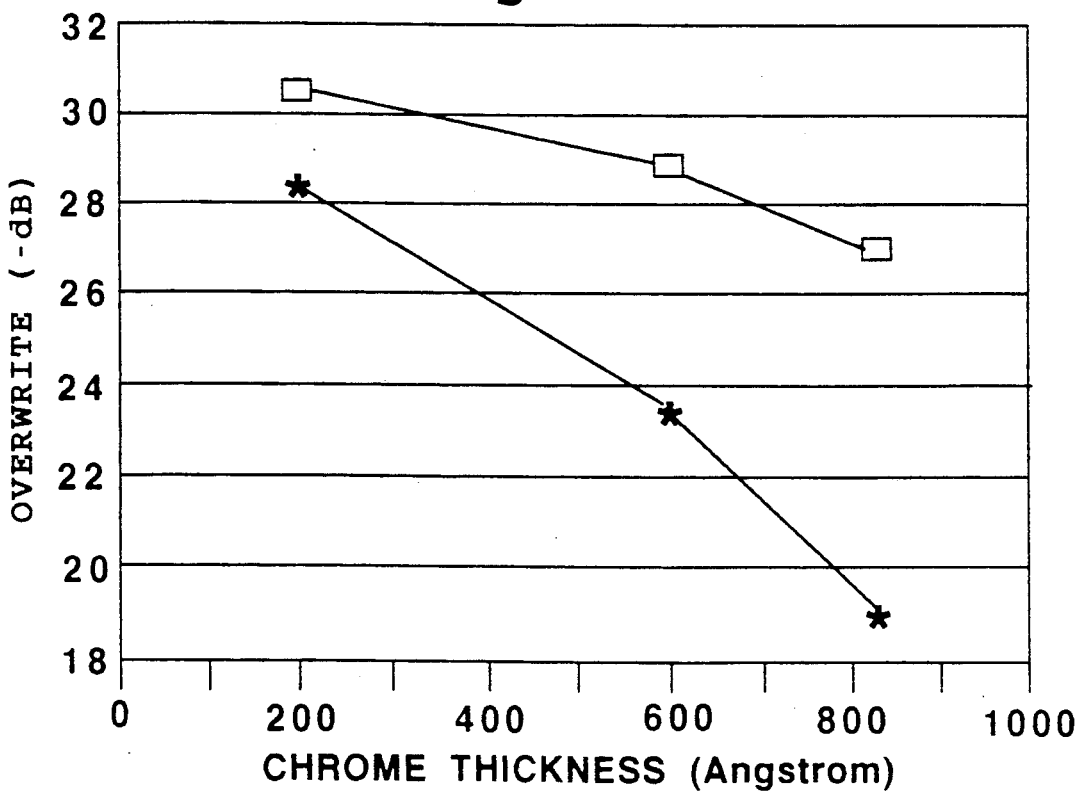
FIG. 14 is a plot of overwrite, in −dB units, as a function of magnetic layer thickness in thin-film media having an 800 Å chromium underlayer and a magnetic layer formed of alloy 1 (*) and alloy 2 (open rectangles)

Both resolution and overwrite characteristics, measured as described above, were highest at a 200 Å film thickness, as can be seen from FIGS. 13 and 14.

Figure 15:
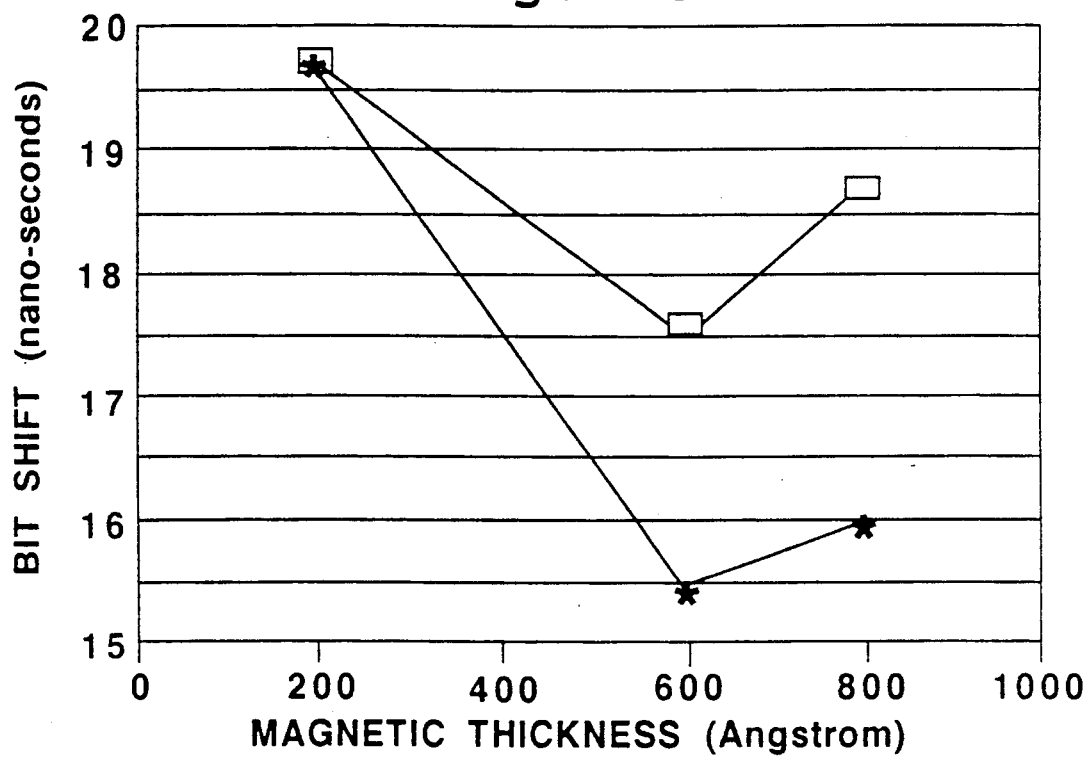
FIG. 15 is a plot of bit shift, in nsecs, as a function of magnetic layer thickness in thin-film media having an 800 Å chromium underlayer and a magnetic layer formed of alloy 1 (*) and alloy 2 (open rectangles)
Figure 16:
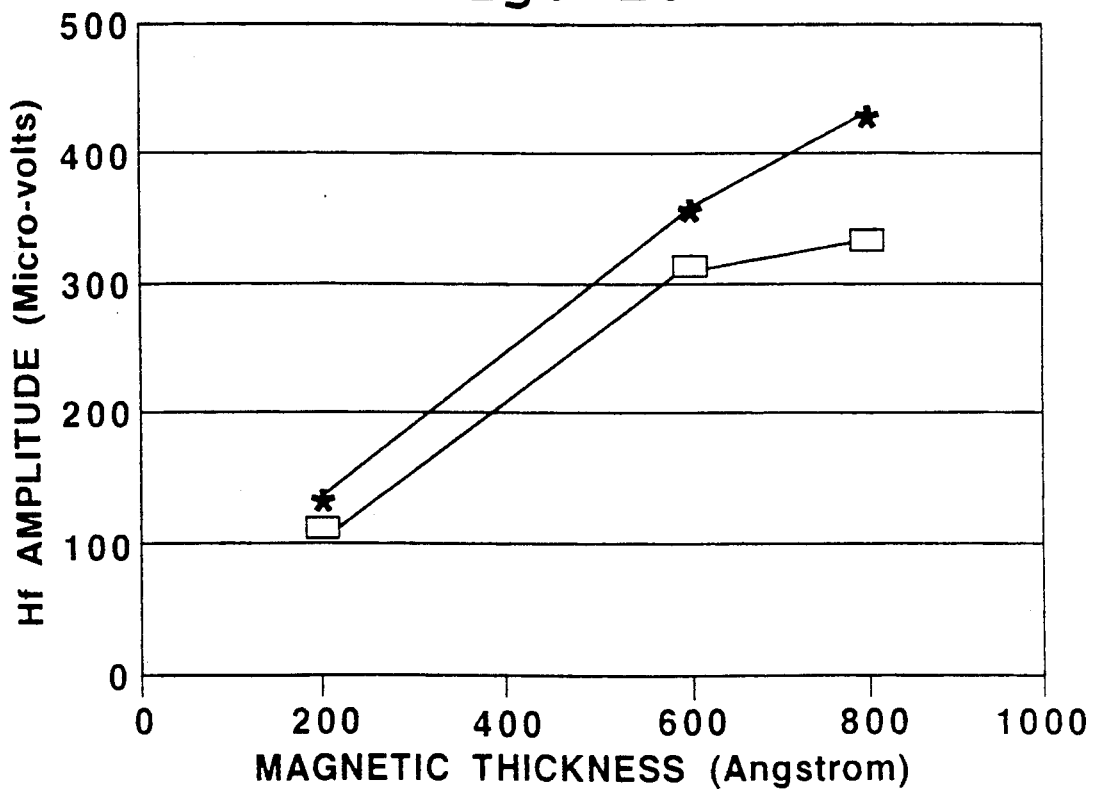
FIG. 16 is a plot of Hf amplitude, in microvolts, as a function of magnetic layer thickness in thin-film media having an 800 Å chromium underlayer and a magnetic layer formed of alloy 1 (*) and alloy 2 (open rectangles)

Bit shift values, shown in FIG. 15, indicate best bit shift characteristics at 600 Å magnetic layer thickness, and a significant improvement in bit shift with the Co/Cr/Pt/Ta magnetic layer. Hf amplitude increased with increasing magnetic layer thickness (FIG. 16), with the Co/Cr/Pt/Ta magnetic film having slightly superior properties.

The film thickness characterizations above indicate how magnetic layer thickness may be selected to achieve desired magnetic properties in the thin-film medium of the invention. Highest coercivity, coercivity squareness, resolution and overwrite are achieved at or near 200 Å. On the other hand, best remanence, loop squareness ratio, and bit shift characteristics are obtained with thicker magnetic films, e.g., 600 or 800 Å. Preferably, the medium of the invention is formed with a film thickness between 200-800 Å depending on the magnetic recording properties which are desired. The magnetic film thickness is controlled by sputter deposition parameters, conventionally.

As is recognized, the coercive force in a thin-film medium depends on grain size, preferred orientation of the C-axis in the film plane and the relative mixing of hcp and fcc crystalline structures.

Thus, according to one important aspect of the invention, it has been discovered that a quaternary Co/Cr/Pt/Ta alloy produces a sputtered crystalline structure whose microcrystalline properties show high coercivity values (e.g., greater than 1,800 Oe) as well as high loop squareness and low bit shift.

Figure 17:
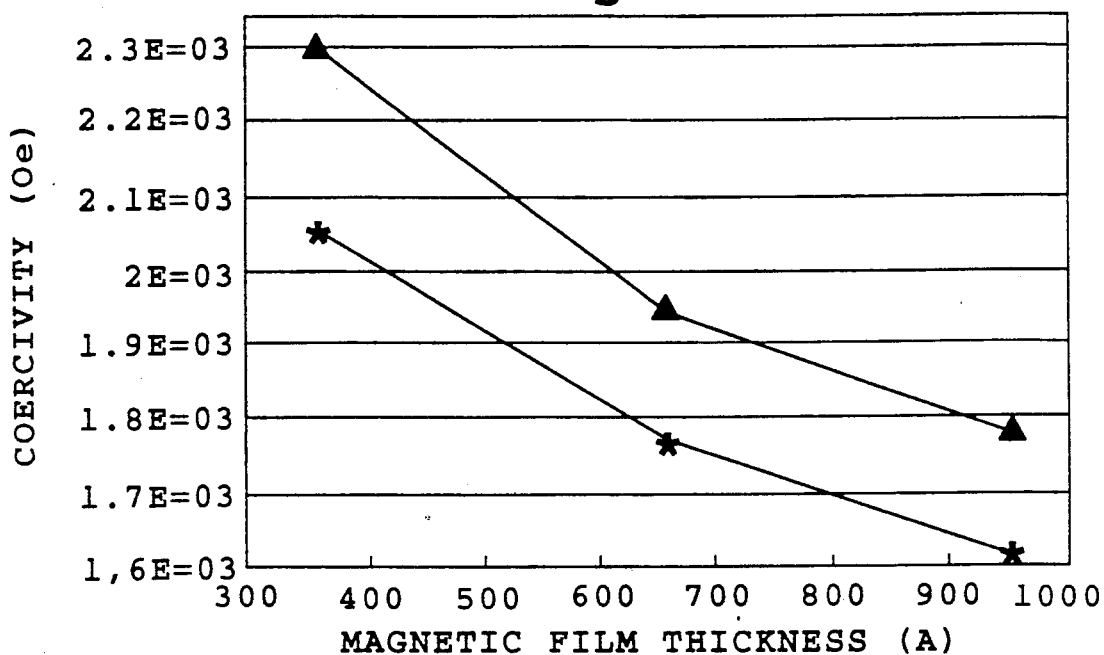
FIG. 17 is a plot of coercivity, in Oe, as a function of magnetic layer thickness in thin-film media having an 800 Å chromium underlayer and a magnetic layer formed of alloy 1 (closed triangles) and a Co/Cr/Pt/Ta alloy containing 5 atom weight platinum (*)

Similar disk characteristics have been obtained in thin-film media formed with Co/Cr/Pt/Ta alloy magnetic films containing 7 and 5 atom percent Pt, in accordance with the invention. FIG. 17 shows a plot of coercivity as a function of magnetic film thickness in disks formed by sputtering onto a substrate and 800 angstrom chromium underlayer: alloy 1 containing 75% Co, 12% Cr, 3% Ta, and 10% Pt (closed triangles), or an alloy containing 79.8% Co, 12.2% Cr, 3% Ta, and 5% platinum (*). The latter film was formed by sputtering from two sides of a target region, the target on one side containing of 84.5% Co, 12.5% Cr, 3% Ta, and 0% Pt, and the target on the other side containing 75% Co, 12% Cr, 3% Ta, and 10% Pt. Equal amounts of material were sputtered from each side of the target, as confirmed by X-ray fluorescence.

As seen in FIG. 17, the coercivity of the 5%-Pt medium was within about 10% of that of the 10%-Pt disk. In a disk formed by sputtering a Co/Cr/Ta/Pt alloy magnetic layer containing 7% Pt, coercivity values equal to or slightly greater than the 10%-Pt disk were obtained. By contrast, thin-film media formed by sputtering a Co/Cr/Ta alloy on a chromium layer have coercivity values typically between about 35-70 percent less than that of the 10%-Pt magnetic layer (e.g., Tables 1 and 2 and FIG. 3).

Figure 18:
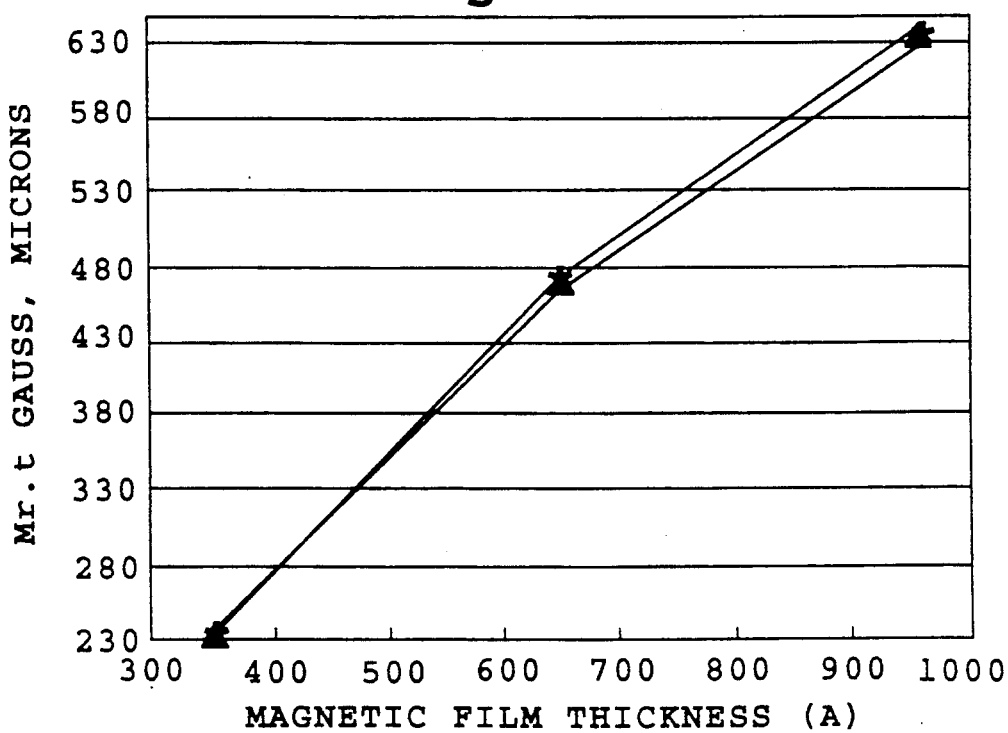
FIG. 18 is a plot of $M_r*t$ as a function of magnetic layer thickness in thin-film media having an 800 Å chromium underlayer and a magnetic layer formed of alloy 1 (closed triangles) alloy 2 and a Co/Cr/Pt/Ta alloy containing 5 atom weight platinum.

The magnetic remanence ($M_r$*t) of the 5%-Pt medium was substantially identical to that 10%-Pt medium, and showed the same dependence of magnetic film thickness, as seen in FIG. 18. The squareness ratio of the two media were also substantially identical, and showed the same dependence on magnetic film thickness.

The high-coercivity microcrystalline structure achieved in the Co/Cr/Pt/Ta alloy may also be achieved in a Co/Ni/Pt/Ta alloy having atomic proportions of 70-80 atom percent Co, 10-20 atom percent Ni, 3-20 atom percent Pt, and 2-10 atom percent tantalum.

After formation of the magnetic thin film, the substrate is carried on the disk holder toward a third sputtering station (not shown) at which a carbon overcoat is applied according to conventional sputtering methods.

III. Properties of the Medium

From the data presented above, it can be appreciated that the thin-film medium of the invention combines high coercivity, loop squareness, resolution, and signal amplitude with bit shift characteristics. In particular, the medium is characterized by:

(a) a coercivity greater than about 1,800 Oersteds;

(b) signal resolution, at 31 kiloflux changes/in, of greater than about 85%;

(c) signal amplitude, measured at a recording frequency of 5.11 MHz, of greater than about 340 microvolts;

(d) a bit shift of less than about 18 nsec, and preferably less than about 16 nsec; and (e) a loop squareness ratio of greater than about 0.85.

Figure 19:
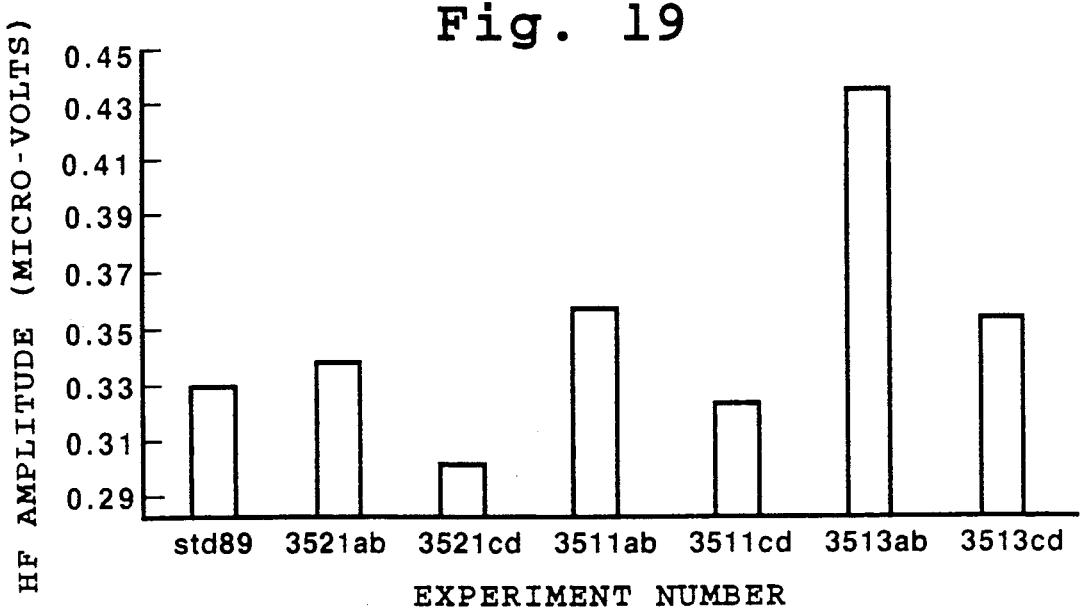
FIGS. 19-22 are bar graphs showing average HF amplitude (FIG. 19), ID resolution (FIG. 20), average peak shift (FIG. 21), and average OD overwrite (FIG. 22) as determined for a commercial thin-film medium (std 89), and for three sets of Co/Cr/Ta/Pt (ab) and Co/Cr/Ta (cd) media.

FIG. 19 shows signal amplitude values for a commercial thin-film disk having a 800 Å magnetic thin film (std 89), three disks sets of disk 3521, 3511, and 3513 which were prepared employing either a Co/Cr/Pt/Ta sputtering target (ab) or a Co/Cr/Ta target (cd) having the alloy compositions described above. It is seen from the figure that all three of the media formed in accordance with the present invention have signal amplitudes greater than that of the commercial disk, and substantially higher than the comparable Co/Cr/Ta media.

Figure 20:
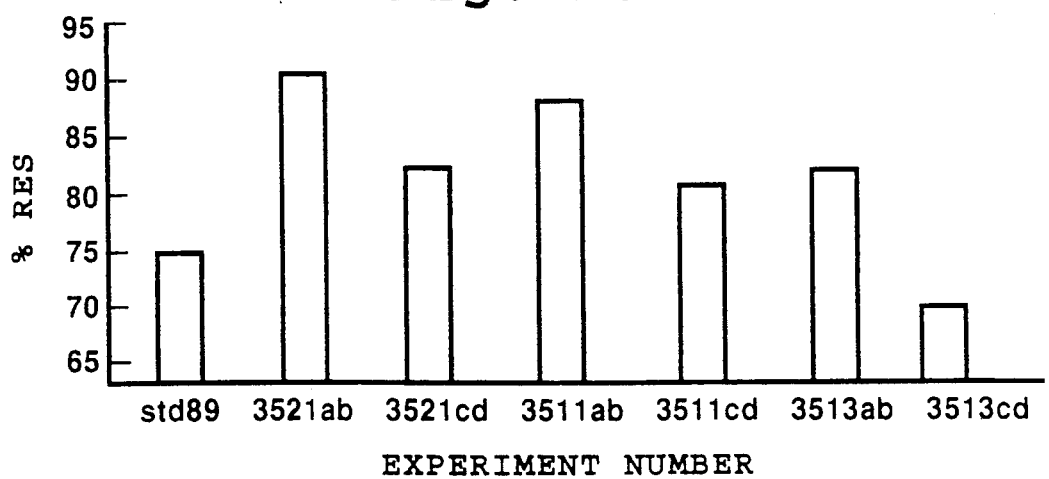

A similar comparison of the atom percent resolution, measured as described above, for commercial disk std 89, and 3521, 3511, and 3513 sets of Co/Cr/Pt/Ta and Co/Cr/Ta media gave the results shown in the bar graph in FIG. 20. In each case, the percent resolution in the medium of the present invention (ab) was about or greater than 85%. The other disks gave resolution values between about 70-83%.

Figure 21:
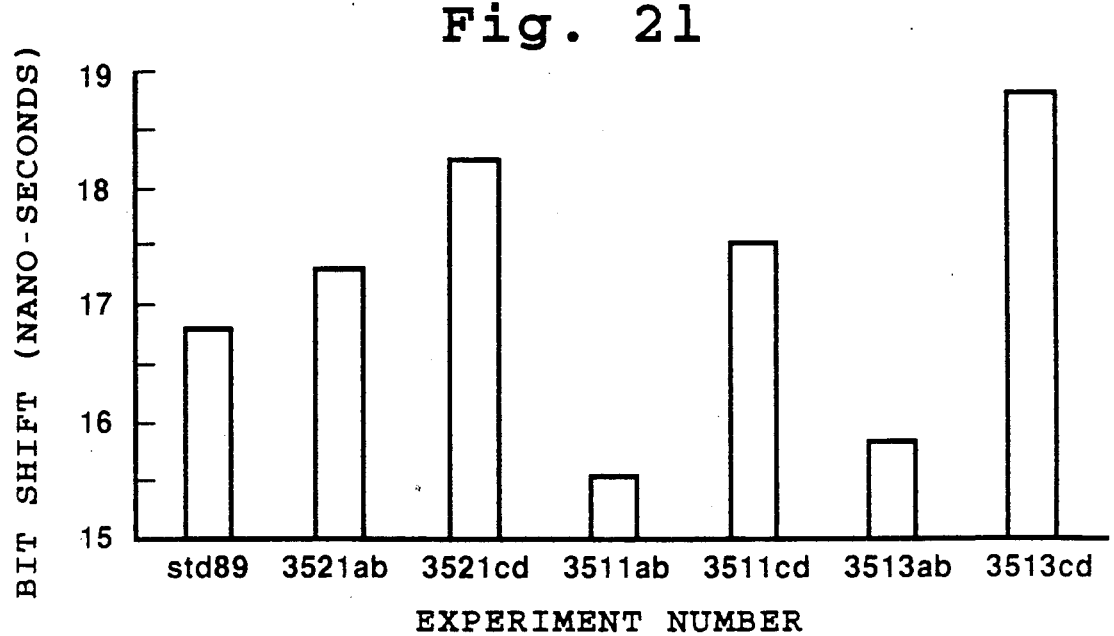

Bit shift values measured for the same commercial disk std 89, and 3521, 3511, and 3513 sets of Co/Cr/Pt/Ta and Co/Cr/Ta media gave the results shown in the bar graph in FIG. 21. Bit shift values for the media of the present invention were all less than 18 nsec, and two of the disk gave values of 16 nsec or less. The bit shift values of the (cd) disks tested were all 1-3 nsec higher than the comparable (ab) disks.

Figure 22:
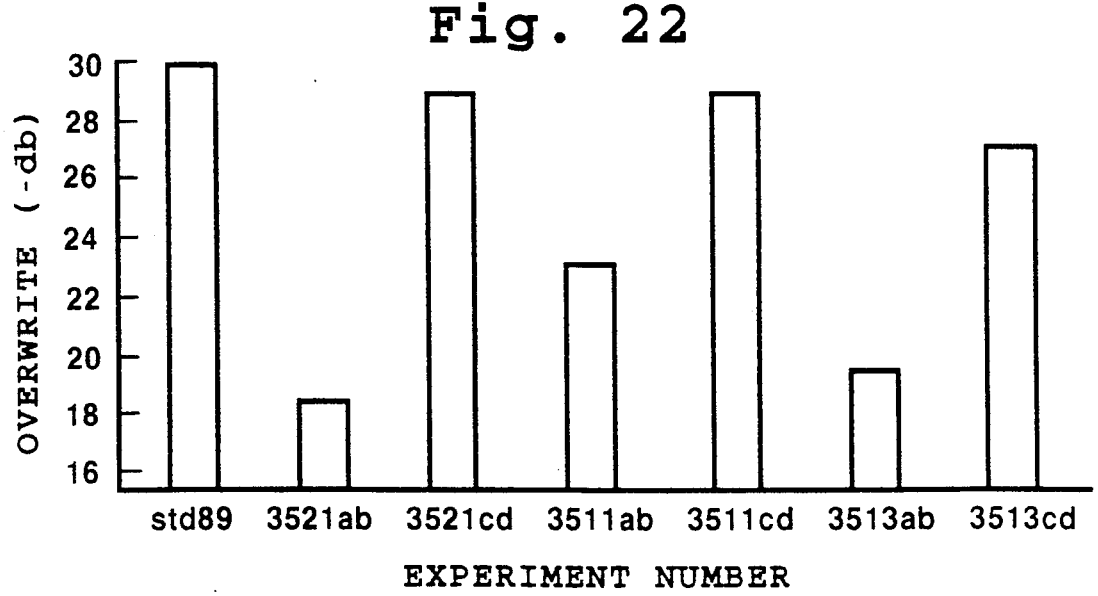

FIG. 22 shows overwrite ratios, expressed in −dB, for the seven test disks. All of the (ab) disks had higher overwrite ratios than the other test disks.

Although the invention has been described with respect to particular embodiments, it will be apparent to those skilled in the art that various changes and modifications can be made without departing from the invention.

It is claimed:

1. A magnetic recording medium comprising
   a substrate;
   a sputtered chromium underlayer on the substrate; and
   a sputtered magnetic layer composed of an alloy containing between 70-80 atom percent cobalt, 10-20 atom percent chromium, 3-20 atom percent platinum, and 2-10 atom percent tantalum, on the chromium underlayer.

2. The medium of claim 1, wherein the sputtered alloy contains at least about 5 atom percent platinum.

3. The medium of claim 1, wherein the magnetic layer is sputtered to a thickness of between about 200–1,000 Å.

4. The medium of claim 1, wherein the underlayer is sputtered to a thickness between about 300 and 3,000 Å.

5. The medium of claim 4, wherein the magnetic layer is sputtered to a thickness between about 200–1,000 Å.

6. The medium of claim 5, which is characterized by a coercivity of greater than 1,800 Oersteds.

7. The medium of claim 5, which is characterized by a bit shift of less than about 16 nsec.

8. The medium of claim 5, which is characterized by a magnetic squareness ratio of greater than about 0.85.

9. The medium of claim 5, which is characterized by a signal resolution, at 31 kiloflux changes/in, of greater than about 85%.

10. The medium of claim 5, which is characterized by a signal amplitude, measured at a recording frequency of 5.11 MHz, of greater than about 340 microvolts.

11. The medium of claim 5, which is characterized by:
  (a) a coercivity greater than about 1,800 Oersteds;
  (b) signal resolution, at 31 kiloflux changes/in, of greater than about 85%;
  (c) signal amplitude, measured at a recording frequency of 5.11 MHz, of greater than about 340 microvolts;
  (d) a bit shift of less than about 16 nsec;
  (e) a loop squareness ratio of greater than about 0.85; and
  (f) a Brt greater than 18,000 Gauss-microinch.

* * * * *